UNITED STATES PATENT OFFICE.

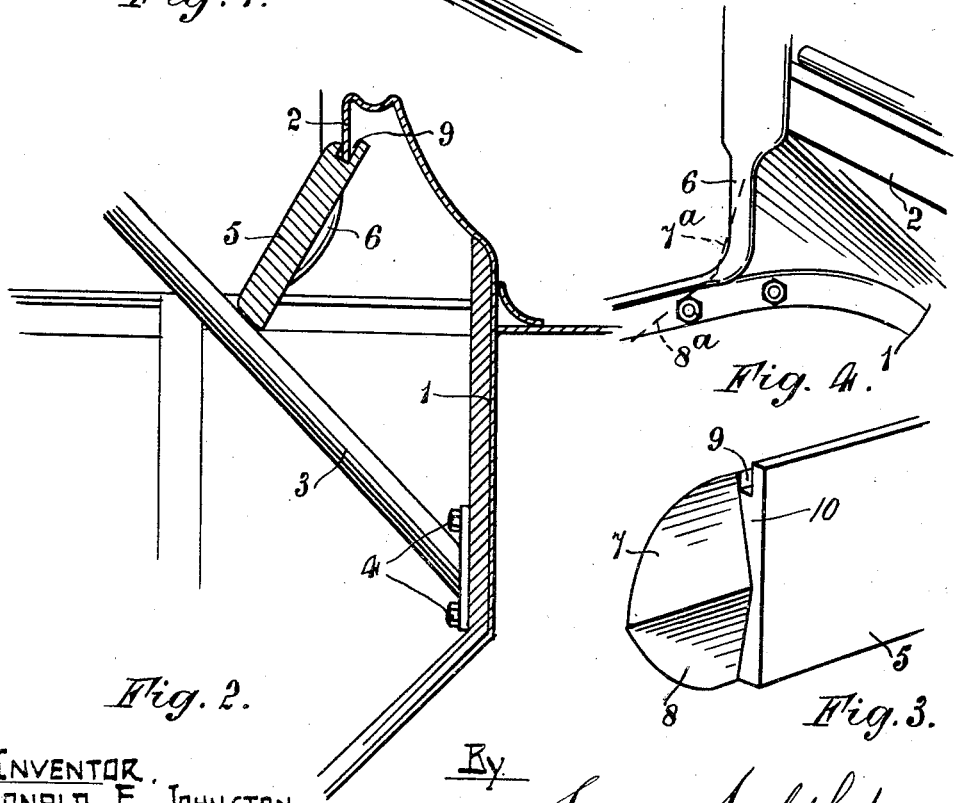

DONALD F. JOHNSTON, OF TORONTO, ONTARIO, CANADA.

AUTOMOBILE CONSTRUCTION.

1,246,604.  Specification of Letters Patent.  Patented Nov. 13, 1917.

Application filed September 18, 1916. Serial No. 120,878.

*To all whom it may concern:*

Be it known that I, DONALD F. JOHNSTON, of the city of Toronto, in the county of York, in the Province of Ontario, in the Dominion of Canada, have invented certain new and useful Improvements in Automobile Constructions, and do declare that the following is a full, clear, and exact description of same.

This invention relates to improvements in the construction of automobiles, being particularly relevant to the dash board and steering post of an automobile, and has for its objects to provide an attachment for, or to, the said dash board of an automobile primarily to eliminate to a great extent vibration in the said steering post for purposes of safety, comfort and convenience; a further object being to reinforce the frame of said dash board thereby reducing the tendency of said frame to rock or warp when the automobile is in motion, squeaking or rattling of the parts of said dash board being, as a result, more or less suppressed.

A still further important object is to effect the exerting of a lateral force against the said steering post for the purpose hereinbefore stated whereby a force is also exerted against the nuts carried by the bolts securing the said steering post to the said dash board, such force tending to reduce the tendency of the said nuts to become loose.

It is proposed to make such attachment in the form of an article of utility beyond the effecting of the objects as hereinbefore set forth, and of such configuration or design that an improvement in the appearance of the automobile so equipped will result, and further objects subsidiary to or resulting from the aforesaid main objects, or from the construction of these improvements as hereinafter described, will become apparent as the invention is further disclosed.

In carrying the invention into effect, I prefer to provide an elongated member (hereinafter called a "cowl board") detachably or otherwise fitted between the dash board of an automobile, and the steering post, said member being of such dimensions that it will, when in position, tend to effect the displacement of said steering post from its normal axial plane thus setting up opposing forces in the said member and said steering post calculated to overcome to a great extent the normal tendency of said steering post to vibrate when the automobile is in motion, the configuration of said member being preferably such that it is adapted for use as an article of utility, such as an instrument board, and capable of acting as a reinforcement for said dash board to prevent "lashing" or excessive noise resulting from violent vibration or warping of the parts of said dash board; all of which is more particularly described and ascertained in and by the following specification having reference to the accompanying drawing in which:

Figure 1 is a perspective view of the dash board and steering post of an automobile to which this invention has been applied.

Fig. 2 is a transverse section through the dash board and cowl board illustrating the relation of the said cowl board to the steering post of the automobile.

Fig. 3 is a detailed rear perspective view of one end of the said cowl board, and Fig. 4 illustrates in perspective one end of the overhanging part of said dash board.

Similar characters of reference indicate similar parts in the several figures of the drawing.

In the example illustrated, 1 represents the dash board of an automobile, said dash board being provided with a somewhat overhanging member 2, and it is in connection with a dash board of this type that it is proposed to describe the invention herein, although the said invention may be adapted to automobiles having dash boards of varying types, a change in the form or method of attachment of the device hereinafter described being merely necessary according to the particular design of the automobile dash board and parts affected by the invention.

3 is the steering post of the automobile, passing through the dash board and secured thereto by bolts 4, 4, and 5 is a member located between the said steering arm 3 and the dash board, this, in the present example, being in the form of an elongated board extending the entire width of the dash board and having its upper edge in juxtaposition to the lower end of the overhanging part 2 of the said dash board 1, and its lower edge pressing against the said steering post, as clearly illustrated in Fig. 2 of the drawing; this form of member 5 being referred to as the "cowl board" for purposes of convenience in describing the illustrated invention, It will be seen that the dash board is flanked by uprights 6, 6, against which the ends of the cowl board abut, and to determine and render rigid such abutment it is preferred to provide the said end parts of the said cowl board with inclined faces 7 and 8 as shown in Fig. 3, both ends of the said board having the formation indicated in the said figure, and the position of such inclined faces with respect to the said uprights 6, 6 is indicated by the dotted lines 7ª and 8ª in Fig. 4, the said inclined faces being intended to act as stopping means to determine the normal position of the board.

9 is a groove in the upper edge of the said cowl board, said groove receiving the lower edge of the overhanging part 2 of the dash board when the said cowl board is in position.

It will be seen that a shoulder 10 is formed at either end of the board, this shoulder preventing, by lateral abutment with the said uprights 6, 6, the displacement of the board transversely of the body of the car.

The width of the cowl board is such that when in position, its lower edge bears against the said steering post in a manner tending to force the said post out of its normal axial plane, whereby opposing forces are set up in the steering post and the cowl board calculated to overcome the usual vibration in the said steering post when the automobile is in motion, thus steadying the said steering post.

The normal angle of the face of the board to the steering post is preferably less than a right angle, and the accidental diminishing of such normal angle is prevented by the stopping means already referred to.

Many accidents have resulted owing to the excessive vibration of the steering post of an automobile, particularly when such automobile has been traveling over very rough roads, causing the driver to lose control of his machine; and it is maintained that the application of the device described will materially reduce such accidents by eliminating to a great extent the cause of the same.

It will be understood that the pressure of member 5 tending to alter the plane of the axis of said steering post, forces are set up in the parts securing the said post to the dash board, certain of said forces operating against the nuts 4, 4 thereby locking the said nuts against becoming loose as so often occurs with nuts of steering posts as heretofore known, the locking effect, of course, in the example shown being greater upon the uppermost nuts which, however, are the nuts usually requiring such locking.

It has been hitherto known to provide a clamp for securing the steering post of an automobile against excessive vibration, but such clamps have only accomplished this object inasmuch as they are in themselves rigid and have not exerted a force upon the said steering post and thereby provided a potential in the steering post to overcome vibration as in the present invention. Neither have such devices operated to produce a locking effect of the nuts securing the steering post to the dash board and in the event of such nuts becoming loose, the clamp has merely become a fulcrum about which the said steering post may vibrate. In the present instance, should the nuts referred to become loose, due to any circumstance, the displacing of said nuts to a certain extent would not permit the post to vibrate, inasmuch as the pressure exerted upon said post by said member 5, would cause said post to take up a further binding position upon the said nuts, which might be the means of averting an accident at a critical moment.

It will be understood that the configuration of the member 5 and its method of attachment may be varied to suit the conditions under which it is used, and the said member may be either of a detachable nature or may be formed as an integral element of the automobile design.

It will be also understood that where the cowl board sets up an opposing force in the steering post, the said force will also serve to lock the said cowl board in position by virtue of the coöperative stopping means and so render unnecessary in so many cases the use of bolts or other fastenings to retain the said cowl board in position.

This invention may be developed within the scope of the following claims without departing from the essential features of the said invention and it is desired that the specification and drawing be read as being merely illustrative and not in a limiting sense, except as necessitated by the prior art.

What I claim as my invention is:

1. In combination with an automobile having a cowl and a steering post spaced therefrom and adapted to yield slightly to vary its distance from the edge of the cowl, a cowl board of a width slightly greater than the normal mean distance between said edge of the cowl and said steering post, said cowl-board having its upper edge engaged with the edge of the cowl and its lower edge abutting the steering post with its face side at less than a right angle thereto, together with positive stopping means adapted to prevent slipping of the board along the post in direction to increase the acuteness of said angle, whereby the pressure of the post, being oblique to the plane of the board, tends to render effective the said stopping means.

2. A cowl-board adapted to be inserted between the edge of the cowl and the steering post of an automobile, the end portions of the board being formed to enter between and abut the side portions of the vehicle body whereby the board when so positioned is automatically rendered incapable of displacement transversely of the said body, and means preventing accidental angular displacement of the said board from its normal position with respect to the steering post of the vehicle.

3. As an improvement in automobile construction, a member engaging both the steering post and the cowl of an automobile to produce a potential force in said post sufficient to overcome excessive vibration thereof, said member extending over and engaging the side members of the automobile body, and being held against accidental displacement by frictional engagement with said post.

4. As an improvement in automobile construction, an elongated member engaging on its opposite edges the steering post and cowl respectively of an automobile, the ends of said member having a configuration adapting them to seat firmly at the junctures of the said cowl and the side members of the automobile body, whereby the steering post will retain said member against accidental displacement.

5. A cowl board for automobiles, adapted to be frictionally secured in position, comprising an elongated member of a width slightly greater than normal mean distance between the steering post and the cowl of an automobile with which the board is to be used, said member being provided with synclinal rear surfaces in proximity to each end thereof to engage the side members of the automobile body, for the purposes specified.

Signed at the city of Toronto, in the county of York, in the Province of Ontario, in the Dominion of Canada, this 14th day of September, 1916.

DONALD F. JOHNSTON.

Copies of this patent may be obtained for five cents each, by addressing the "Commissioner of Patents, Washington, D. C."